| (12) United States Patent | (10) Patent No.: US 9,003,491 B2 |
| Herzog et al. | (45) Date of Patent: Apr. 7, 2015 |

(54) SECURE PUSH AND STATUS COMMUNICATION BETWEEN CLIENT AND SERVER

(75) Inventors: Shai Herzog, Bellevue, WA (US); Johannes Klein, Sammamish, WA (US); Alexandru Gavrilescu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 13/324,723

(22) Filed: Dec. 13, 2011

(65) Prior Publication Data

US 2012/0090017 A1 Apr. 12, 2012

Related U.S. Application Data

(62) Division of application No. 11/957,815, filed on Dec. 17, 2007, now Pat. No. 8,099,764.

(51) Int. Cl.
*G06F 15/16* (2006.01)
*H04W 12/08* (2009.01)
(Continued)

(52) U.S. Cl.
CPC ........... *H04W 12/08* (2013.01); *H04L 12/5895* (2013.01); *H04L 51/38* (2013.01);
(Continued)

(58) Field of Classification Search
CPC ... H04L 12/5895; H04L 63/102; H04L 67/26; H04L 12/1859; H04L 51/38; H04L 67/04; H04L 67/303; H04L 63/166; H04W 12/08; H04W 4/12
USPC ......... 713/155, 168, 170; 726/4, 21; 709/206, 709/227; 380/229, 247
See application file for complete search history.

(56) References Cited

U.S. PATENT DOCUMENTS 6,687,743 B1 2/2004 Innes
6,742,127 B2 5/2004 Fox et al.
(Continued)

FOREIGN PATENT DOCUMENTS

WO 2006-070067 A1 7/2006
WO 2006-077283 A1 7/2006

OTHER PUBLICATIONS

Aziz et al.; "Privacy and Authentication for Wireless Local Area Networks"—Sun Microsystems, Inc., Jul. 26, 1993, pp. 1-13.
(Continued)

*Primary Examiner* — Saleh Najjar
*Assistant Examiner* — Peiliang Pan
(74) *Attorney, Agent, or Firm* — John Jardine; Aaron Chatterjee; Micky Minhas (57) ABSTRACT

Systems and methods of authentication and authorization between a client, a server, and a gateway to facilitate communicating a message between a client and a server through a gateway. The client has a trusted relationship with each of the gateway and the server. A method includes registering the client with the gateway. The client also constructs the address space identifying the gateway and the client. The client communicates the address space to the server. The client receives an identity identifying the server. If the client authorizes to receive a message from the server through the gateway, the client informs the authorization to the gateway. The client puts the identity identifying the server on a list of servers which are authorized to send messages to the client. In addition, the client communicates the list of servers to the gateway.

20 Claims, 9 Drawing Sheets

(51) Int. Cl.
  *H04L 12/58* (2006.01)
  *H04L 29/06* (2006.01)
  *H04L 29/08* (2006.01)
  *H04W 4/12* (2009.01)
  *H04L 12/18* (2006.01)

(52) U.S. Cl.
  CPC ........... *H04L 63/102* (2013.01); *H04L 67/303* (2013.01); *H04L 67/26* (2013.01); *H04W 4/12* (2013.01); *H04L 67/04* (2013.01); *H04L 12/1859* (2013.01); *H04L 63/166* (2013.01)

(56) References Cited

U.S. PATENT DOCUMENTS

| | | | |
|---|---|---|---|
| 6,795,924 | B1 | 9/2004 | Kiessling |
| 7,103,772 | B2 | 9/2006 | Jørgensen et al. |
| 7,240,212 | B2 | 7/2007 | Arnone et al. |
| 7,409,428 | B1* | 8/2008 | Brabec et al. .................. 709/206 |
| 7,895,445 | B1* | 2/2011 | Albanese et al. ............. 713/185 |
| 8,024,784 | B1* | 9/2011 | Issa .................................. 726/9 |
| 2001/0002914 | A1 | 6/2001 | Aramoto |
| 2002/0031230 | A1* | 3/2002 | Sweet et al. .................. 380/278 |
| 2003/0046586 | A1 | 3/2003 | Bheemarasetti |
| 2003/0076808 | A1 | 4/2003 | McNiff et al. |
| 2003/0165121 | A1 | 9/2003 | Leung et al. |
| 2004/0068649 | A1 | 4/2004 | Haller et al. |
| 2004/0122907 | A1 | 6/2004 | Chou et al. |
| 2005/0083929 | A1* | 4/2005 | Salo et al. ..................... 370/389 |
| 2007/0073808 | A1 | 3/2007 | Berrey |
| 2007/0214209 | A1* | 9/2007 | Maeda .......................... 709/202 |
| 2007/0244818 | A1 | 10/2007 | Tsuji et al. |
| 2007/0260674 | A1 | 11/2007 | Shenfield |
| 2008/0005263 | A1* | 1/2008 | Baraev et al. ................. 709/217 |
| 2008/0068995 | A1* | 3/2008 | Skog .......................... 370/230.1 |
| 2008/0189774 | A1 | 8/2008 | Ansari et al. |
| 2008/0271146 | A1* | 10/2008 | Rooney et al. .................. 726/23 |
| 2008/0293486 | A1* | 11/2008 | Newcombe ..................... 463/29 |
| 2010/0332824 | A1* | 12/2010 | Little et al. .................... 713/156 |

OTHER PUBLICATIONS

Burnside et al.; "Proxy-Based Security Protocols in Networked Mobile Devices"—ACM copyright 2002, pp. 265-272.

Kwon et al.; "Integrated Transport Layer Security: End-to-End Security Model between WTLS and TLS"—IEEE copyright 2001, 7 pages.

Podner et al., "Mobile Push: Delivering Content to Mobile Users*," European Commission under Contract 1ST-1999-10288 (OPELIX), pp. 1-6.

* cited by examiner

SECURE PUSH AND STATUS COMMUNICATION BETWEEN CLIENT AND SERVER

BACKGROUND

Mobile clients are often non-addressable or even unreachable from the public internet due to the Network Address Translation, firewall filtering and other network-related reasons. In such situations, the mobile client connectivity is asymmetric, since it is virtually one way: the client can initiate a connection to a server with a public internet address, but the server cannot initiate a connection to the client.

When it comes to delivering messages "instantly," also known as "push" delivery, the client can "push" a message instantly to the server, but the server typically cannot do the same. If the server has a message to be sent to the mobile client, the server cannot send it immediately, but instead has to wait until the client first initiates a connection.

SUMMARY

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

Embodiments described herein relate to systems and methods of authentication and authorization between a client and a server to facilitation message communication between the client and the server through a gateway.

As discussed herein, an aspect of some embodiments relates to a method of authentication and authorization between a client, a server, and a gateway to facilitate communicating a message between the client and the server through the gateway, the client having a trusted relationship with each of the gateway and the server, the method including: registering the client with the gateway, including: forming a push channel between the client and the gateway to allow the gateway to communicate with the client, and receiving an address space identifying the gateway; constructing the address space identifying the gateway and the client; communicating the address space to the server; receiving an identity identifying the server; and if the client authorizes to receive a message from the server through the gateway, informing the authorization to the gateway, including: putting the identity identifying the server on a list of servers which are authorized to send messages to the client; and communicating the list of servers to the gateway.

Another aspect of some embodiments relates to a system for authenticating and authorizing a client and a server through a gateway to facilitate message communication, the system including a push channel controller programmed to control an open channel between the client and the gateway. The system also includes a client registration and status module programmed to register the client, the client registration and status module communicating with the push channel controller to track a communication link status of the client, the client registration and status module distributing the communication link status of the client to the server. The system further includes a push authorization module programmed to authorize a message to be sent to the client based on comparing an identity of the server to an authorization list of approved servers.

Further aspects relate to a method of communicating a message between a client and a server through a gateway. The method includes requesting a token from the client. The method also includes receiving the token from the client, the token identifying the client and the gateway and authorizing the server. The method further includes sending a message along with the token to the gateway. The gateway forwards the message to the client after the token is validated by the gateway.

DETAILED DESCRIPTION

This disclosure will now more fully describe exemplary embodiments with reference to the accompanying drawings, in which specific embodiments are shown. Other aspects may, however, be embodied many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments described herein relate to systems and methods of authentication and authorization between a client and a server to facilitate message communication between a client and a server through a gateway.

Figure 1:
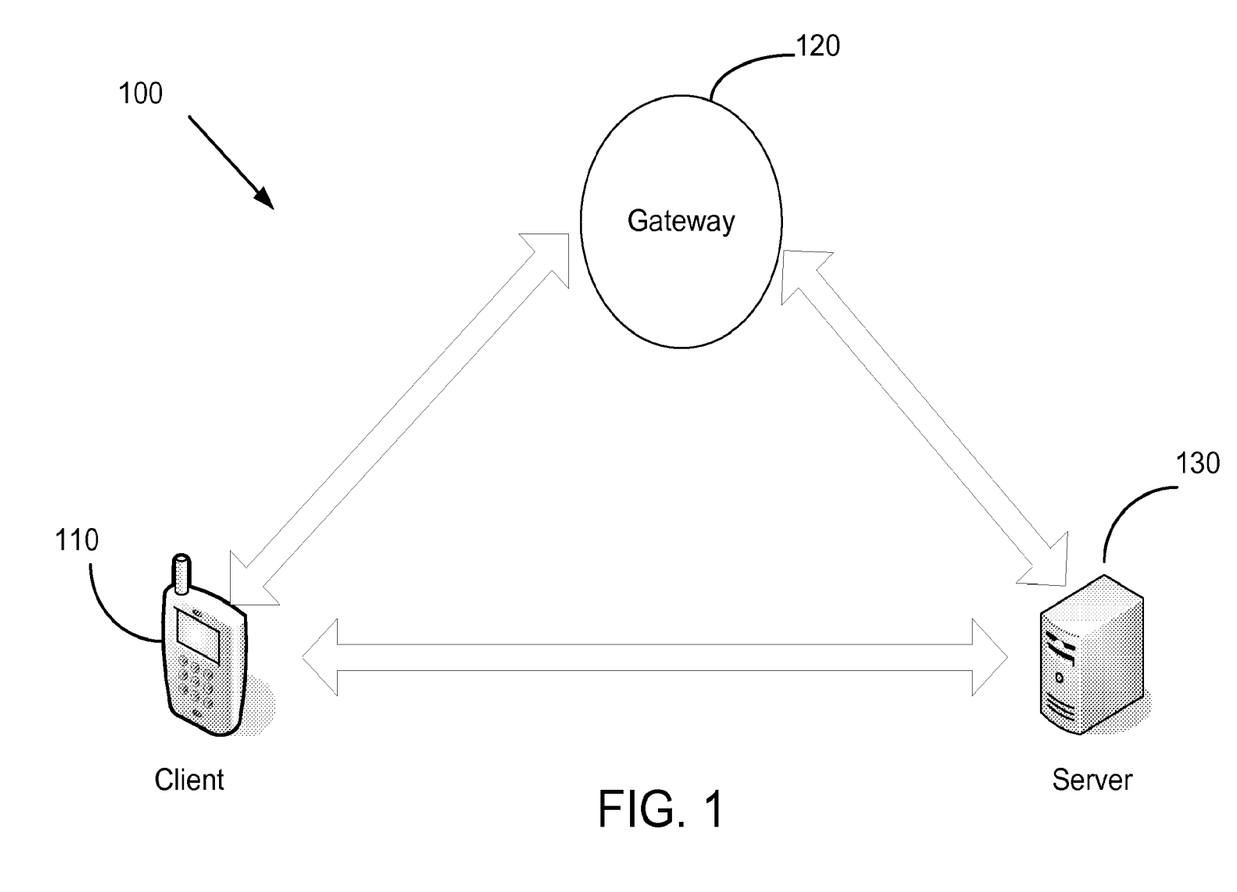
FIG. 1 is a block diagram illustrating an exemplary system for a message communication between a client and a server through a gateway according to the present disclosure.

FIG. 1 is a block diagram illustrating an exemplary system 100 for a message communication between a client 110 and a server 130 through a gateway 120 according to the present disclosure. The message to be communicated in the system 100 can be any kind of information or data such as texts, emails, voice messages, images and pictures. The client 110 can be a computer that accesses a service on another computer through network. The client 110 can also be a mobile phone, a portable media player, a smartphone, a personal digital assistant, an information appliance, a personal communicator, a handheld game console, an ultra-mobile personal computer, a handheld television, or any other type of electronic device which is able to communicate with another system through a network.

The client 110 is in communication with the gateway 120 and the server 130. The client 110 registers with the gateway 120. For example, the client 110 establishes a bi-directional communication link with the gateway 120 so that the gateway 120 can forward messages to the client 110. In addition, the client 110 establishes a trust relationship with the gateway 120 so that the client 110 trusts the gateway 120 for forwarding messages to the client 110. In other words, the client 110 accepts messages forwarded by the gateway 120.

When the client 110 registers with the gateway, the client 110 also receives an address space that identifies the gateway 120. The client 110 can further construct the address space to identify the gateway 120 and the client 110. The client 110 then can communicate the address space to the server 130 and instruct the server 130 to contact the gateway 120 if the server 130 wishes to send a message to the client 110. The gateway 120 filters out unwanted messages from reaching the client 110. The client 110 receives the message from the gateway 130 after the server 120 sends the message to the gateway 120 based on the address space.

In some embodiments, the address space can be a universal resource locator (URL). The address space can be any other type of identifier that can identify the gateway 120. In the example shown, the URL has a hierarchical format that encodes multiplexing criteria. Generally, the URL has the following exemplary format: {Gateway DNS Name}/{Client Name}/{Application Name}/{Extension}. The first portion "Gateway DNS Name" is the domain name of the gateway in the Domain Name System (DNS). The first portion thus tells a server where to send a message (i.e., the push gateway). The second portion "Client Name" tells the gateway 120 which client should receive the message. The third portion "Application Name" tells the client 110 which client application residing on the client should receive it. The fourth portion "Extension" is an extension of the application. The "Extension" is optional. One particular example can be shown as: PushGW.xyz.com/Client123/App456/doc.

The gateway 120 is in communication with the client 110 and the server 130. The gateway 120 is responsible for registering the client 110 to the gateway 120. The client 110 establishes communication between the client 110 and the gateway 120.

In some embodiments, the gateway 120 also maintains an online/offline status of the client 110 so that the gateway 120 knows whether the client 110 is connected or disconnected. The gateway 120 is also programmed to know whether the client 110 is still connected, or newly connected to the gateway 120. The gateway 120 can distribute the status information of the client 110 when queried by a third party or can communicate the change in status information to parties that subscribe to receive the client status changes.

In example embodiments, the server 130 is any type of server that is programmed to push content to the client 110. For example, the server 130 can be an email server, a sales server, a web server, a database server, a file server, a print server, or any other kind of line of business server. In one example, the server 130 is a Microsoft Exchange Server offered by Microsoft Corporation of Redmond, Wash. Other configurations are possible.

When the server 130 wishes to send a message to the client 110, the server 130 sends the message to the gateway 120 first. After the gateway 120 receives the message from the server 130, the gateway 120 determines whether the gateway 120 should forward the message to the client 110 based on identifier (authentication and authorization) information in the message. The identifier information can be an address space such as that described above. The identifier information can also be a token, which is described further below in reference to FIGS. 8 and 9. Once the message is authorized by the gateway 120, the gateway 120 forwards the message to the client 110.

In one possible embodiment, the communication between the gateway 120 and server 130 is conducted using a Transport Layer Security (TLS) protocol or its predecessor, Secure Sockets Layer (SSL) protocol communication both of which provide secrecy as well as mutual authentication between the server 130 and the gateway 120 such that the gateway 120 securely knows the identity of the sending server 130. In alternative embodiments, the communication can be based on other protocols that provide secure communications on the Internet for such activities as web browsing, e-mail, Internet faxing, instant messaging and other data transfers. The message can be in the form of Hypertext Transfer Protocol (HTTP) or Service Oriented Architecture Protocol (SOAP) message. In alternative embodiments, the message can be a message based on other protocols for exchanging messages over computer networks.

In one possible embodiment, if the messages for multiple clients come from a same server 130 and use a same gateway 120, the message communications can be aggregated over a single communication channel between the server and the gateway as described above. The single channel can be a SSL or TLS communication channel.

The server 130 is in communication with the client 110 and the gateway 120. The server 130 queries a communication link status of the client 110 through the gateway 130. The server 130 also maintains information about the client 110 whether it is connected to the server 130 and how to reach the client 110 for pushing a message. Once the server 130 wishes to send a message to the client 110, the server 130 sends it to the gateway 120 first. The gateway 120 forwards the message to the client 110 after the message is authorized by the gateway 120.

As discussed above, the server 130 usually communicates with the gateway 120 when the server 130 wishes to send a message to the client 110. However, the client 110 can initiate and directly communicate with the server 130. In addition, the server 130 can have multiple server applications running on the server 130. Each server application may send a separate message to the client 110.

Figure 2:
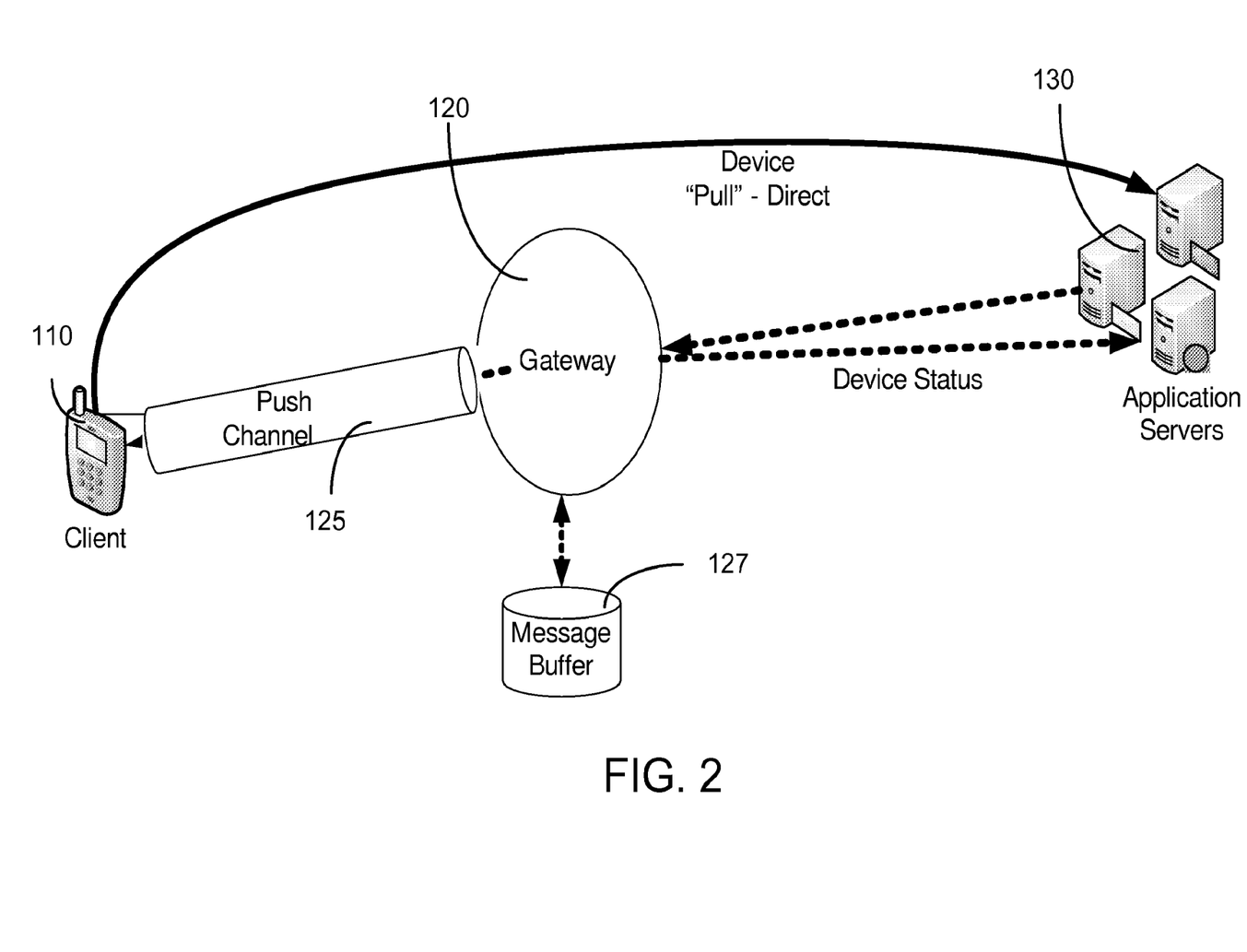
FIG. 2 is a block diagram illustrating communication modes that the server may have with the client in FIG. 1.

FIG. 2 is a block diagram illustrating communication modes that the server 130 may have with the client 110 in FIG. 1. The first mode is a pull mode. The pull mode is a network communication where the initial request for data originates from the client 110, and then is responded to by the server 130.

The second mode is a push mode. In the push mode, the server 130 initiates a request to the client 110 through the gateway 120 and over a push channel 125. In other words, the server 130 sends a message to the client 110 through the gateway 120. In some embodiments, the message exchange between the server 130 and the gateway 120 is conducted using the address space or token described herein. Once the gateway 120 receives the message, the message can also be saved in a message buffer 127. In one possible embodiment, the gateway 120 operates in a mode queuing the message in the message buffer 127 until it can be delivered to the client. Preferably, the message buffer 127 is a persistent message storage such that messages are first stored in a shared message queue database, and any one of an array of the gateways can pick up messages for any of the clients 110 connected to it at the time. The advantages of this embodiment are that the messages survive long client device offline periods. In addition, the clients 110 can move between gateways 120 without losing their queued messages. Further, the gateways 120 can be recycled without any loss of messages.

The third mode is the status query mode where a query is sent to the gateway 120 by the server 130. A response is sent back by the gateway 120 indicating the status of the client 110, i.e., whether or not the client 110 is offline or connected to the gateway 120.

Figure 3:
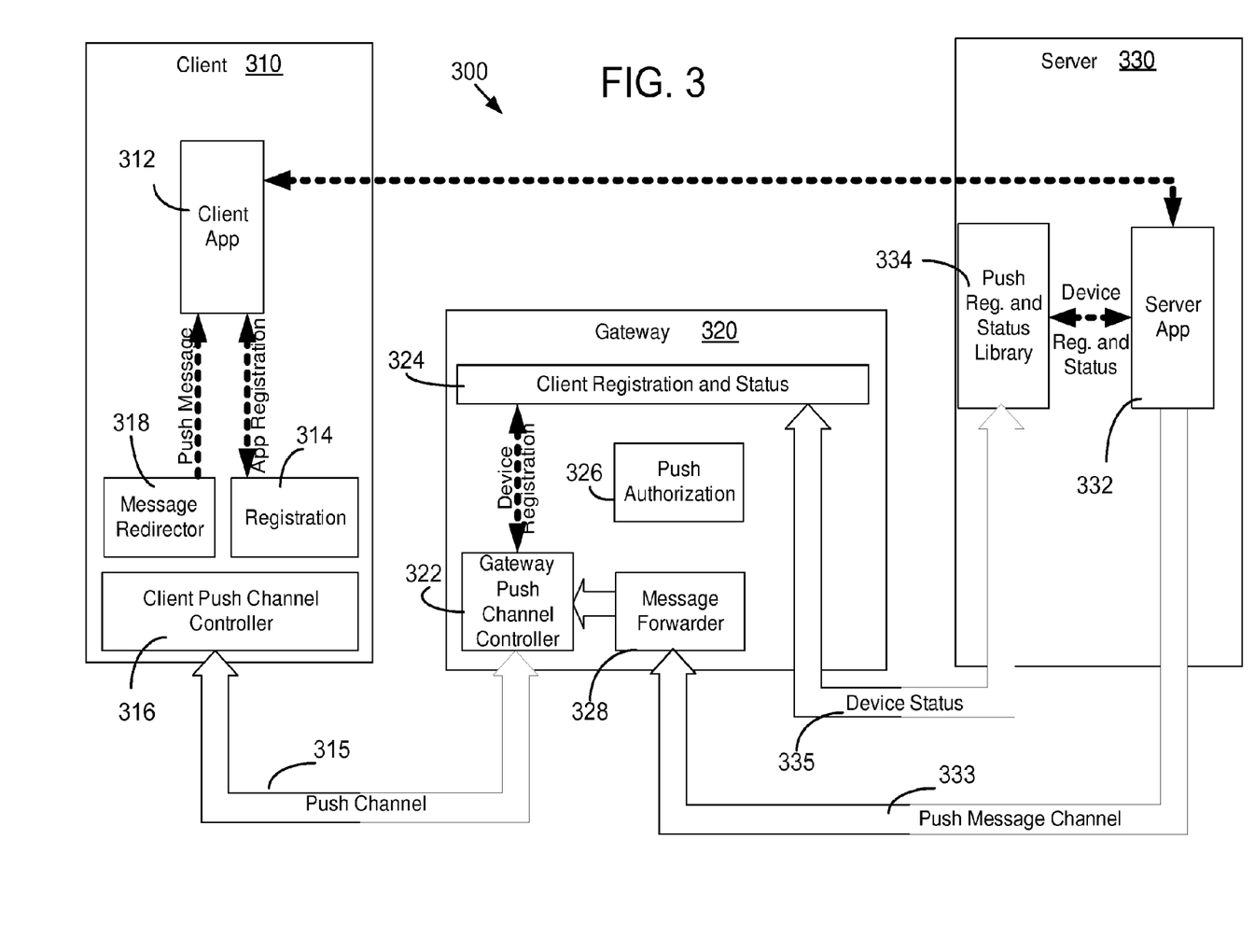
FIG. 3 is a schematic block diagram of an exemplary message communication system according to a possible embodiment of the present disclosure.

FIG. 3 shows a schematic block diagram of another exemplary message communication system 300 according to a possible embodiment of the present disclosure. The communication system 300 can be a more detail application of the embodiments illustrated in FIGS. 1 and 2. The communication system 300 includes a client 310, a gateway 320 and a server 330. Generally, a message is communicated from the server 330 to the client 310 through the gateway 320.

The client 310 includes a client application 312, a registration module 314, a client push channel controller 316, and a message redirector 318. The client application 312 is configured to run on the client 310. The client 310 can have multiple client applications 312. In example embodiments, the client application 312 is a program that performs a task for the client 310, such as an email application client. The client application 312 receives service from the server 330 and server applications 332 (discussed below). The service can be any kind of service that the server 330 and the server applications 332 are able to provide to the client 310 and the client application 312. For example, the service from the server 330 and the server applications to the client 310 and the client applications 312 can be providing updated information, delivering messages, transferring data, updating software versions, requesting information, and any other service to be used in the client 310 and the client applications 312.

The registration module 314 is programmed to register the client 310 with the gateway 320. The registration module 314 builds a push channel 315 between the client 310 and the gateway 320. In particular, the registration module 314 receives an address space from the gateway 320. The address space identifies the gateway 320. In one possible embodiment, the address space is a URL. The registration module 314 constructs an address space for specific applications that register for pushing a message. The registration module 314 also builds a multiplexing database including the address space and application information for the message redirector 318 to use to forward incoming push messages.

The client push channel controller 316 is responsible for controlling the open channel 315 between the client 310 and the gateway 320. The client push channel controller 316 supports both connecting and disconnecting from the gateway 320. In addition, the client push channel controller 316 maintains an open connection with the gateway 320. In one possible embodiment, the client push channel controller 316 maintains the open connection with the gateway 320 through keep-alive messages, which are periodic, small packets of data sent between the client 310 and the gateway 320. In other words, receiving the keep-alive messages indicates that the client is connected and online. On the other hand, missing the keep-alive messages suggests that the client 310 is disconnected and offline.

When there is a failure of connection between the client 310 and the gateway 320, the client push channel controller 316 supports recovering from the failure. The client push channel controller 316 can be configured to support various open channel types. For example, the client push channel controller 316 supports at least three different channel types: Virtual Private Network (VPN), long lived TCP and/or HTTP connection, and clear line of sight (non NAT-ed) registration of client Internet Protocol (IP) address (similar to dynamic DNS).

The message redirector 318 is programmed to forward from the gateway 320 to the client application 312 a message that specifies the client 310 and the client application 312 to receive the message. In one possible embodiment, the message redirector 318 forwards the message based on a URL inside the message and the registration database formed by the registration module 314 as discussed above.

The message communication system 300 also includes the gateway 320. The gateway 320 includes a gateway push channel controller 322 which is programmed to control the open channel 315 between the client 310 and the gateway 320. The gateway push channel controller 322 is the counterpart of the client push channel controller 316 in the client 310.

The gateway 320 also includes a client registration and status module 324 which is programmed to register the client 310. The client registration and status module 324 is responsible for registering any new clients for the gateway 320. In addition, the client registration and status module 324 communicates with the gateway push channel controller 322 to track a communication link status of the client 310. The gateway 320 is the hub of the status information.

In example embodiments, the client 310 does not communicate directly with the server 330 to communicate its status since the direct communication consumes battery and overall air bandwidth. Instead, the server 330 gets the status information directly from the gateway 320, which gets the status information from the client 310. In one possible embodiment, the client registration and status module 324 tracks a communication link status of the client 310 based on keep-alive messages from the client 310. In another possible embodiment, the client registration and status module 324 can also learn about the client status from explicit disconnect signaling sent either from the client 310 or the radio controller or other networking component the client 310 is or was connected to. The client registration and status module 324 interacts with the gateway push channel controller 322 to figure out whether the client 310 is still connected, and to identify status change events (like disconnect and reconnect).

The client registration and status module 324 also distributes the communication link status of the client 310 to the server 330 when inquired or for subscribers when the communication link status changes. In particular, the server 330 can ask the gateway 320 with a one-time query for the client status. The server 330 can also subscribe to a client status "news" channel which maintains the client status information. If servers 330 subscribes to the "news" channel, the gateway 320 will notify all the servers 330 on the subscription list when the gateway 320 learns about a client status. For example, the gateway 320 will notify the subscribers of the servers 330 when the client 310 changes connection status, i.e., comes online or goes offline.

Typically, with the absence of direct disconnect signaling, the gateway 320 may not know about the disconnection of the client 310 immediately. The gateway 320 learns about it implicitly when the next scheduled keep-alive message from the client 310 does not arrive, or when attempts to push down a message to the client 310 fail. In addition, when subscribing to the client status news channel, the server 330 may specify its tolerance for out-of-date information. The gateway 320 may adjust a keep-alive timer with the client 310 to comply with those tolerance requirements. For example, if the keep-alive timer is 30 minutes, but a server has a 10 minute tolerance, the keep-alive frequency may need to change to 10 minutes.

The gateway 320 further includes a push authorization module 326 which is programmed to authorize a message to be sent to the client 310. The gateway 320 filters unwanted push messages from reaching the client 310. This filtration can be done to, for example, save client bandwidth and battery. In one possible embodiment, the push authorization module 326 performs authorization of pushing a message to the client 310 based on a server white list which lists servers that are authorized to send a message to the client 310 through the gateway 320.

The gateway 320 supports at least two forms of server authorization. The first one is an information technology (IT) configured server list on the gateway 320. Those servers on the server list are allowed to push a message to the client. The second one is a client-initiated list which is a list of authorized servers as maintained by the client 310. The logical relationship between the two lists may vary based on a gateway configuration mode. In other words, whether a push message can reach the client 310 depends on the gateway configuration mode.

For example, the gateway 320 can be configured to the following four different modes. The first mode is called the Bunker mode. In the Bunker mode, the push authorization module 326 authorizes a message to be sent to the client 310 from the server 330 when the server is authorized on both the IT configured server list and the client initiated list. The second mode is the open mode. In the open mode, the push authorization module 326 authorizes a message to be sent to the client 310 from the server 330 when the server is authorized on either the IT configured server list or the client initiated list. The third mode is the IT mode. In the IT mode, the push authorization module 326 authorizes a message to be sent to the client 310 from the server 330 when the server is authorized on the IT configured server list. The fourth mode is the client mode. In the client mode, the push authorization module 326 authorizes a message to be sent to the client 310 from the server 330 when the server is authorized on the client initiated list.

Although particular white lists and authorization modes are illustrated in the exemplary embodiment, other embodiments might use different authorization methods, lists and modes. For example, an ad-hoc authorization (like Kerberos) can be used. A per-push payment mechanism can also be used. In addition, the authorization list format can be as simple as pairs consisting of combination of a DNS name of a server and a trusted root, where the server name is validated through a certificate by any trusted root (or specific trusted root). For example, an identity of the server can be considered as a specific trusted root that identifies and distinguishes the server from other servers.

Since the authorization lists are maintained on the gateway 320 and the client 310 side, the lists and any server in the lists can be revoked instantly at any time without notice to the servers. This revocation without a notice is particularly useful where there is a need to respond to excessive activities, a change in a client state (e.g., roaming), or a distributed denial of service (DDoS) attack.

Finally, the gateway 320 includes a message forwarder 328. The message forwarder 328 is programmed to first receive the message from the server 330. The message forwarder 328 consults with the push authorization module 326 on authorization of the message. The message forwarder 328 delivers the message to the client 310 subject to the authorization of the push authorization module 326 and based on an address space identifying the client 310 in the message.

The message communication system 300 also includes the server 330. The server 330 includes one or more server applications 332 configured to run in the server 330. The server applications 332 provide service to the client applications 312. The server application 332 can send a message to the client 310 through the gateway 320. Particularly, a push message channel 333 is formed between the message forwarder 328 and the server application 332. In one possible embodiment, the message communication through the push message channel 333 between the gateway 320 and server 330 is a SSL communication. In a possible embodiment, the message communicating through the push message channel 333 is a SOAP format message.

The client application 312 can contact the server application 332 directly if the client application 312 wishes to do so. The server 332 instead then can respond to the client 312 directly. If the client application 312 does not directly communicate to the server application 332 first, the server application 332 needs to push a message to the client application 312 through the gateway 320.

The server 330 also includes a push registration and status library 334. The push registration and status library 334 maintains information about clients that are connected to the server 330. The push registration and status library 334 also contains information about how to reach clients for push. A device status channel 335 is formed between the push registration and status library 334 and the client registration and status module 324. The push registration and status library 334 communicates the client registration and status module 324 to queue and receive the client status information from the gateway 130 which receives the client status information from the client 310.

Figure 4:
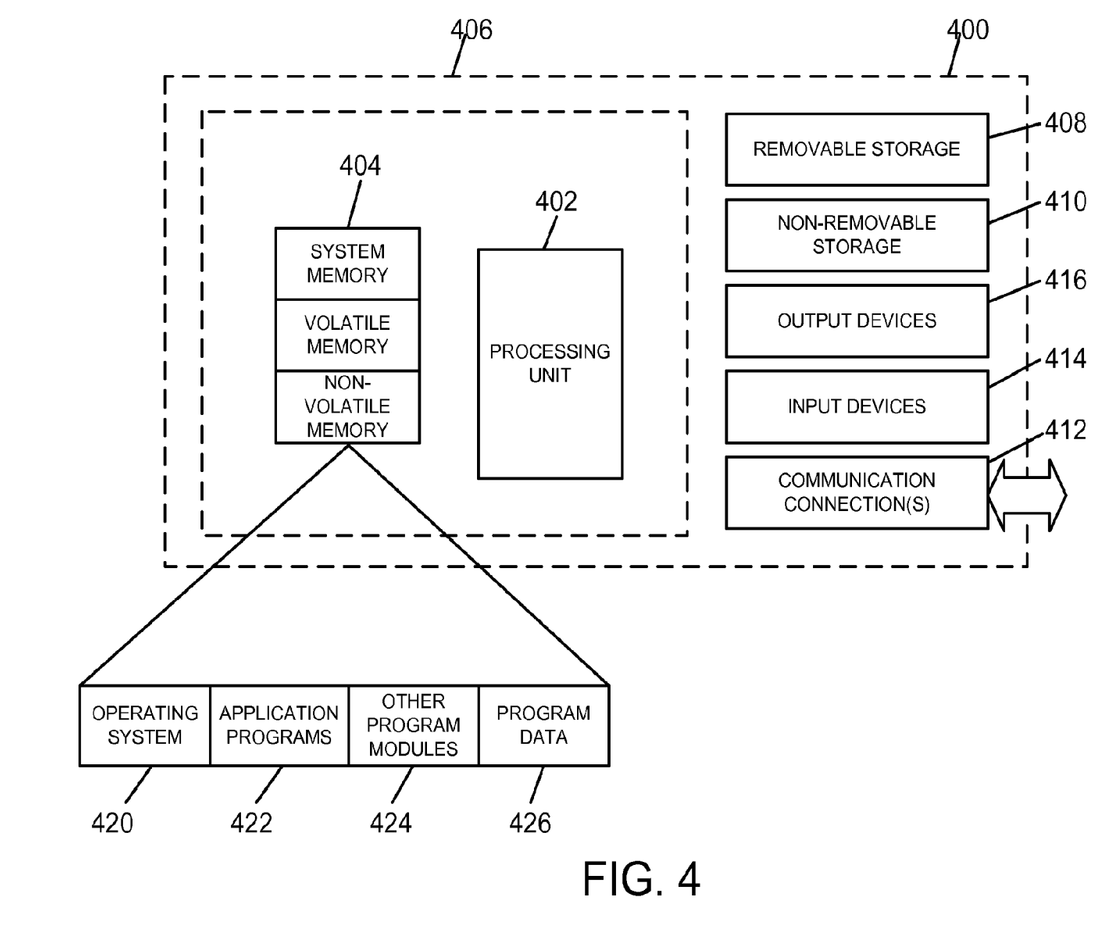
FIG. 4 is an exemplary computing system for implementing aspects of the present disclosure.

FIG. 4 is an exemplary computing system 400 for implementing aspects of the present disclosure. For example, computing system 400 can be one of client 310, gateway 320 and/or server 330 as discussed above. In its most basic configuration, computing system 400 typically includes at least one processing unit 402 and memory 404. Depending on the exact configuration and type of computing system, memory 404 may be volatile (such as RAM), non-volatile (such as ROM, flash memory, etc.) or some combination of the two. This most basic configuration is illustrated in FIG. 4 by dashed line 406. Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing system 200. Any such computer storage media may be part of computing system 400.

Computing system 400 may also contain communications connection(s) 412 that allow the computing system to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

In some embodiments, memory 404 includes one or more of operating system 420, application programs 422, other program modules 424, and program data 426. In some embodiments, global data, client-specific data, and transformation rules may each be stored in memory 404, removable storage 408, non-removable storage 410, or any other computer storage media described herein.

Figure 5:
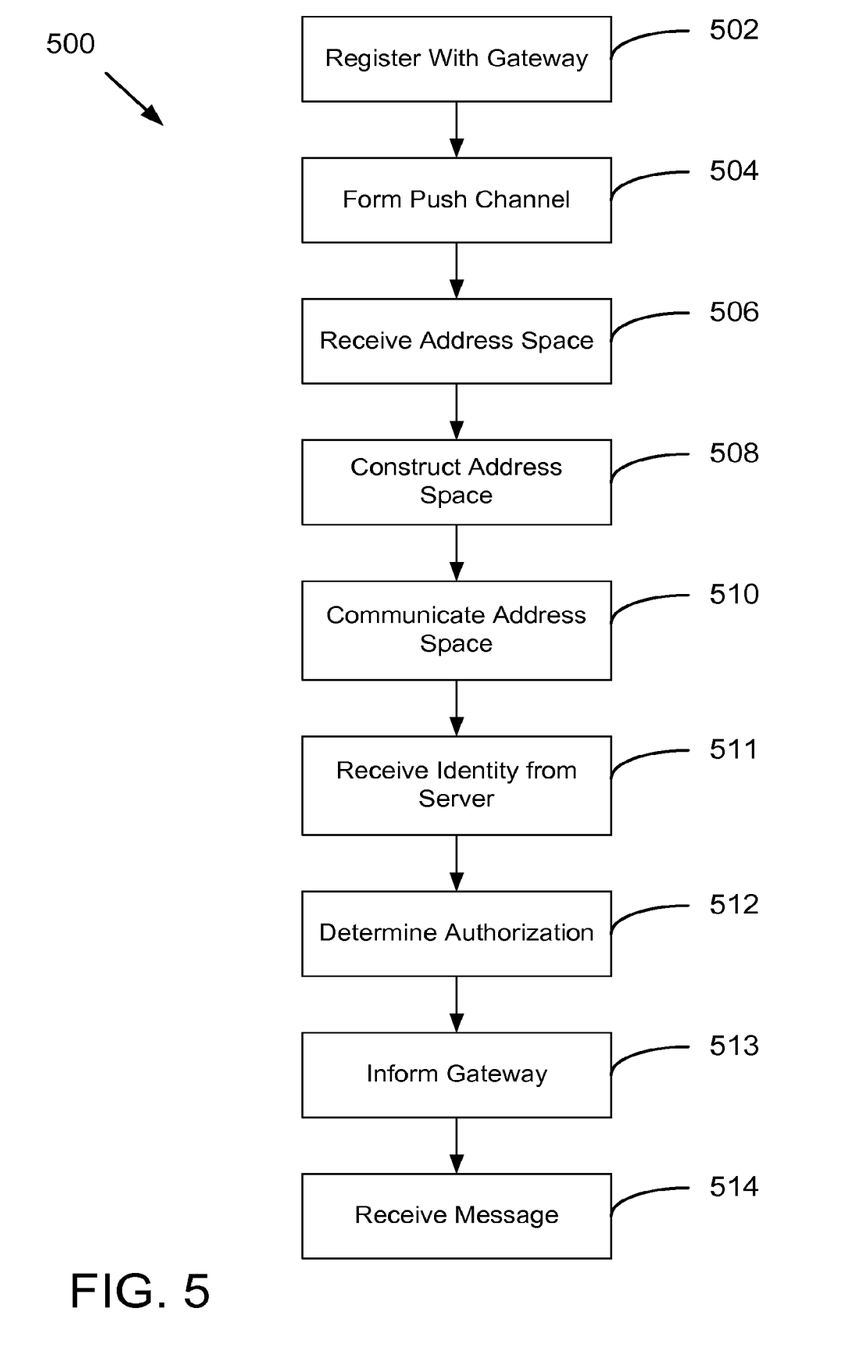
FIG. 5 is an example method of communicating a message between a client and a server through a gateway.

FIG. 5 illustrates an example method of communicating a message between a client and a server through a gateway. The client orchestrates the gateway and the server in communicating the message by having a trusted relationship with each of the gateway and the server. At operation 502, the client registers with the gateway. The client includes one or more client applications which run in the client. The client applications use service from the server which also includes one or more server applications. The client registers with the gateway regarding its client applications.

Registering the client and the client applications includes forming a bi-directional push channel Forming the push channel is shown in the operation 504. The bi-directional push channel is formed between the client and the gateway so that they can communicate each other. In particular, through the push channel, for example, the gateway can communicate with the client asynchronously and send asynchronous messages to the client and the client applications at any time.

Registering the client and the client applications also includes receiving an address space from the gateway. Receiving the address space is shown in operation 506. When the client registers with the gateway, the client receives the address space identifying the gateway. In one possible embodiment, the address space is a URL. In other words, once the client gives the URL to the server, the server should be able to locate the gateway by the URL and know where to send a message.

Operational flow proceeds to an operation 508. At the operation 508, the client constructs the address space of the gateway also to identify the client and the client application.

Operational flow proceeds to an operation 510. At the operation 510, the client gives the address space to the server so that the server knows where to send a message to the client. Since the address space identifies the gateway, the server thus knows that the server will send the message to the gateway first. In addition, since the address space also identifies the client and its application, the server is able to specify which client and application should receive the message. As discussed above, for example, the form of the address space can be a URL format.

Operational flow proceeds to an operation 511. At the operation 511, the client receives an identity identifying the server. This identity may be in the form of a server DNS name and a trusted root.

Operational flow proceeds to an operation 512. At the operation 512, the client determines whether the client authorizes the server to receive a message from the client.

Operational flow proceeds to an operation 513. At the operation 513, the client notifies the gateway if the client authorizes to receive a message from the server through the gateway. In other words, the client will notify the gateway this authorization so that the gateway will forward the message to the client if the gateway receives it from the server. If the server is not authorized by the client, the gateway will drop the message and do not forward it to the client. Even after the client has authorized the server to send the message to the client through the gateway, the client can revoke the authorization at any time without a notice to the server. The client can authorize as many as servers and server applications to send a message to the client through the gateway. The gateway thus lookups the list of the authorized servers to decide whether a message received from servers should be forwarded to the client and its applications. As discussed above, the client can revoke any authorization and thus can remove any authorized server from the list to have the message be sent to the client. In other words, the client is in control which server to receive a message from.

Operational flow proceeds to an operation 514. At the operation 514, the client receives the message from the gateway after the server sends to the gateway the message identifying the client as a recipient. In particular, once the gateway receives the message, the gateway will determine whether the server is authorized by the client. If so, the gateway will forward the message to the client and its application which is specified in the message.

Figure 6:
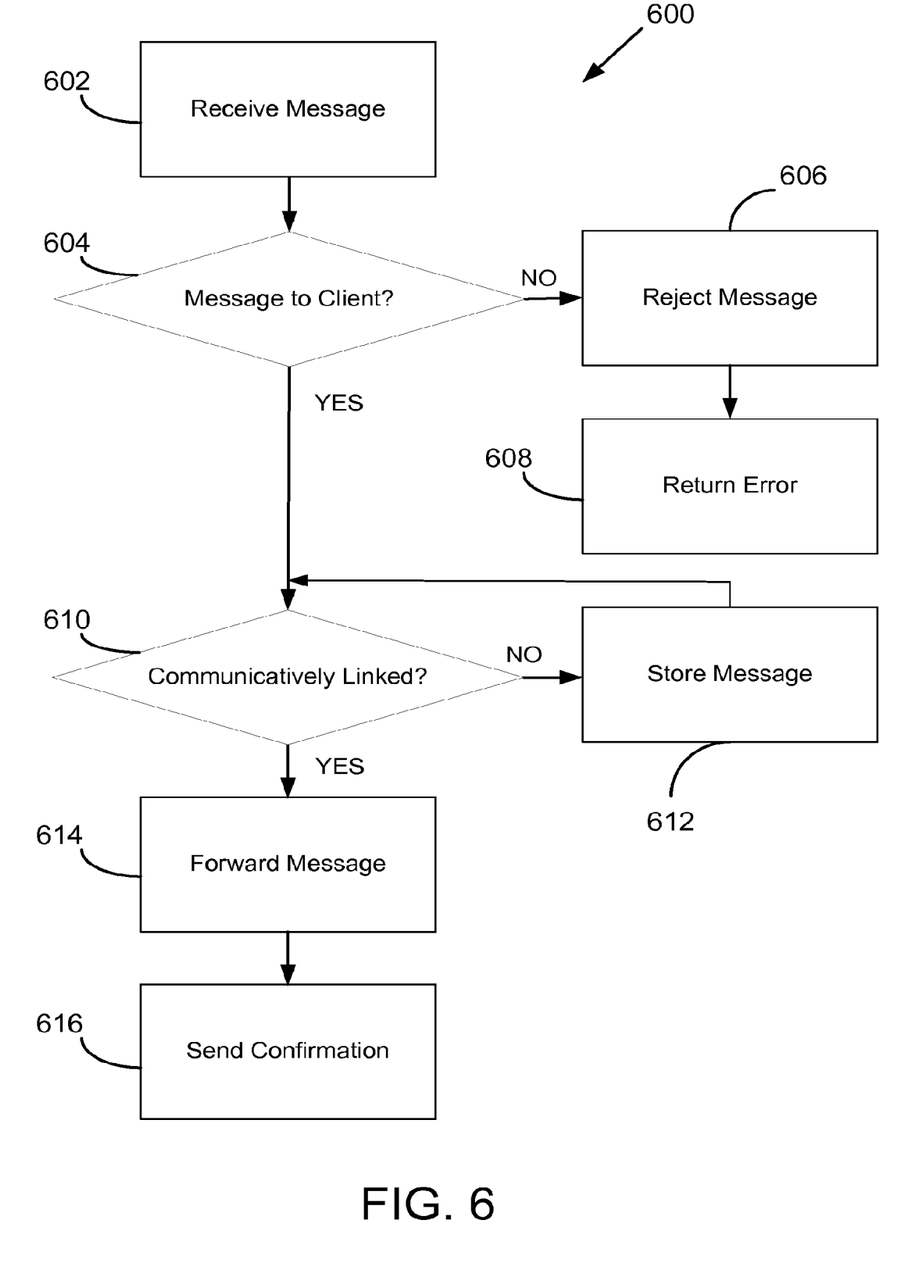
FIG. 6 is another example method of communicating a message between a client and a server through a gateway.

FIG. 6 illustrates another example method 600 of communicating a message between a client and a server through a gateway. At operation 602, the gateway receives the message from the server. The message includes information identifying the client to receive the message. In one possible embodiment, the communication between the gateway and the server is conducted over a SSL connection. The message from the server to the gateway is a SOAP message. In alternative embodiments, the communication between the gateway and the server can be conducted over a TLS connection.

Operational flow proceeds to an operation 604. The operation 604 determines whether the gateway delivers the message to the client. In particular, if the client has authorized the server to send the message to the client, then operational flow branches "Yes" to an operation 610. If the client has not authorized the server to send the message to the client, the operation flow branches "No" to an operation 606. At the operation 606, the gateway rejects to send the message to the client. Operation flow then proceeds to an operation 608 which is an optional operation to return an error notice to the server.

The operation 610 determines whether the client is communicatively linked to the gateway. In particular, the gateway tracks the client status to see whether the client is connected. If the operation 610 determines that the client is communicatively linked to the gateway, then operational flow branches "Yes" to an operation 614 where the gateway forwards the message to the client. If the operation 610 determines that the client is not communicatively linked to the gateway, then operational flow branches "No" to an operation 612 where the gateway stores the message in storage until the client is communicatively linked to the gateway. At an operation 616, the gateway sends a confirmation notice to the server that the message has been delivered to the client.

Figure 7:
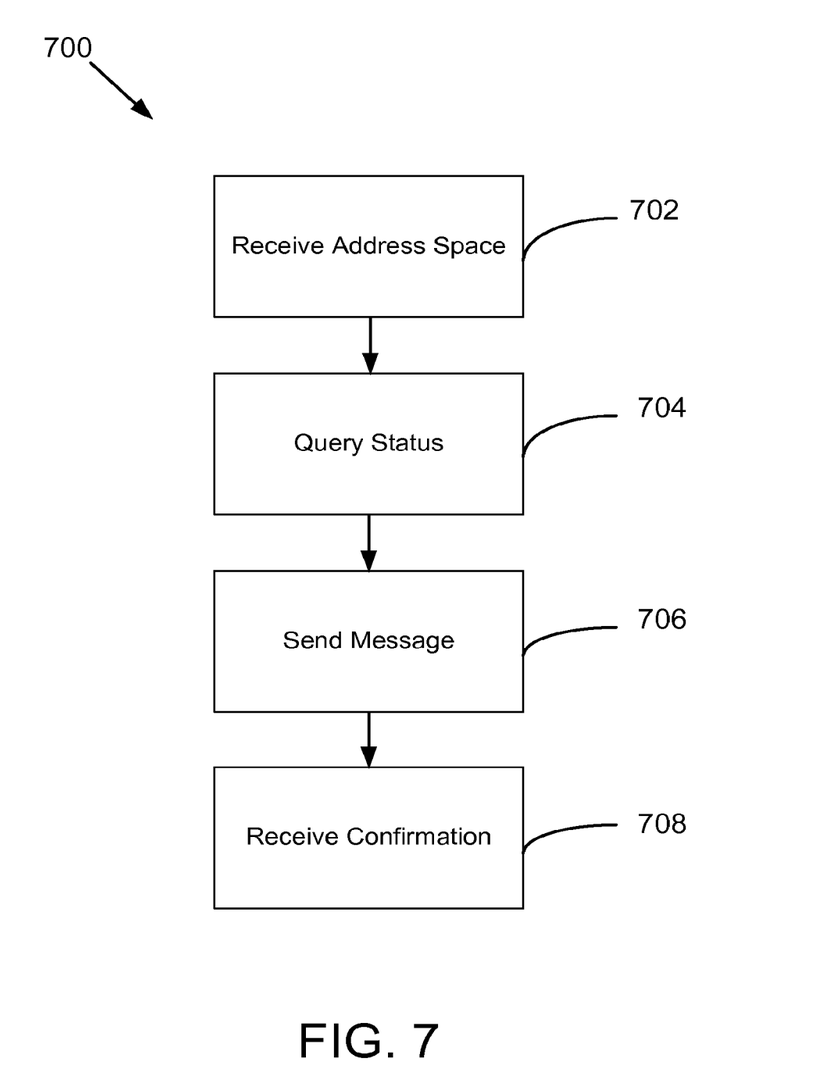
FIG. 7 is an example method of communicating a message between a client and a server through a gateway.

FIG. 7 illustrates an example method 700 of communicating a message between a client and a server through a gateway. At an operation 702, the server receives from the client an address space that indicates the gateway and the client. One possible format of the address space is a URL format, as discussed above. By knowing the URL, the server can know where to send a message, i.e., the server will send the message to the gateway first.

Operational flow proceeds to an operation 704. At the operation 704, the server queries a client status through the gateway which tracks the client online/offline status information. Once the server gets the client status information, the server may send a message to the client through the gateway. In an alternative embodiment, the server can send a message to the client through the gateway without first querying the client status.

Operational flow proceeds to an operation 706 where the server sends a message to the client through gateway. Once the gateway receives the message, the gateway will determine whether to forward the message to the client based on whether the server has been authorized to send a message to the client. Generally, the client can make the authorization. In alternative embodiment, the gateway makes authorization in term of an information technology configured list. In another possible embodiment, the decision is based on both the client initiated list and the information technology configured list.

Finally, operational flow proceeds to an operation 708 where the server receives a confirmation once the message has been successfully delivered to the client. On the other hand, if the gateway determines the message will not be forwarded to the client, the gateway may also optionally send an error notice that the message is filtered out and is not sent to the client.

Figure 8:
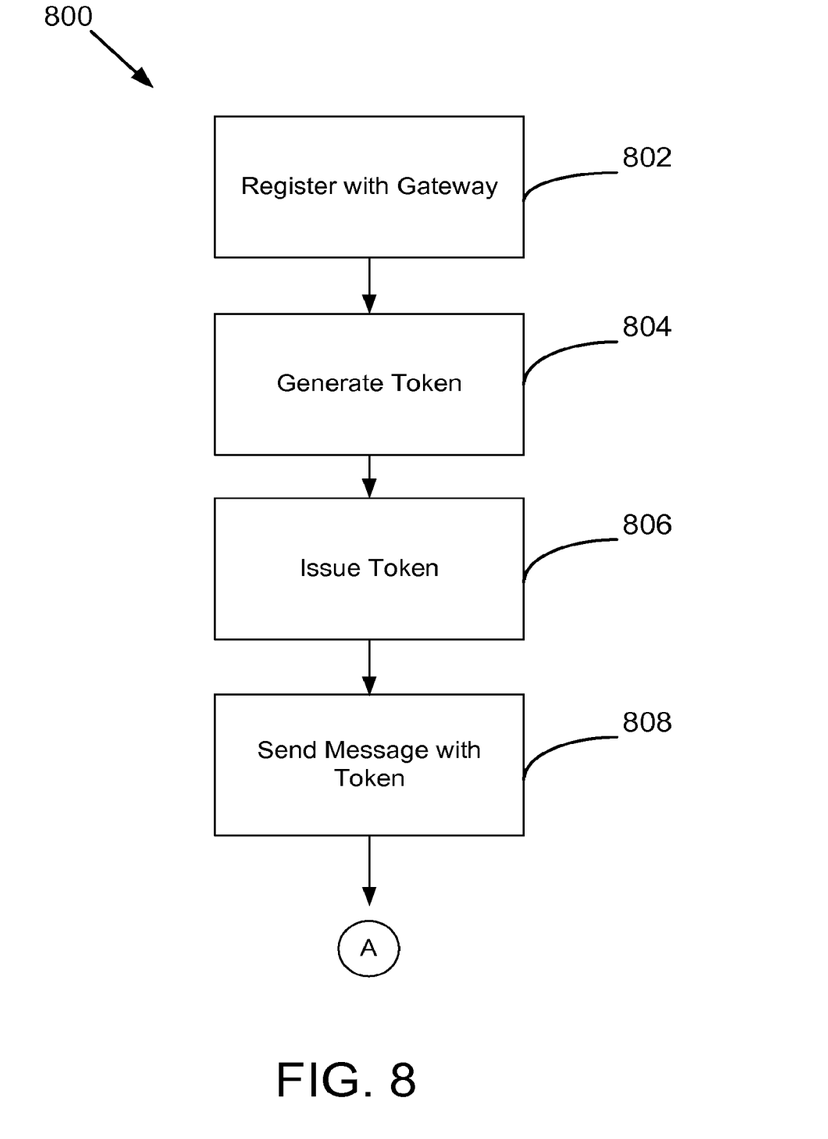
FIGS. 8 and 9 show an example method for communicating a message between a client and a server through a gateway using a token according to another possible embodiment of the present disclosure.
Figure 9:
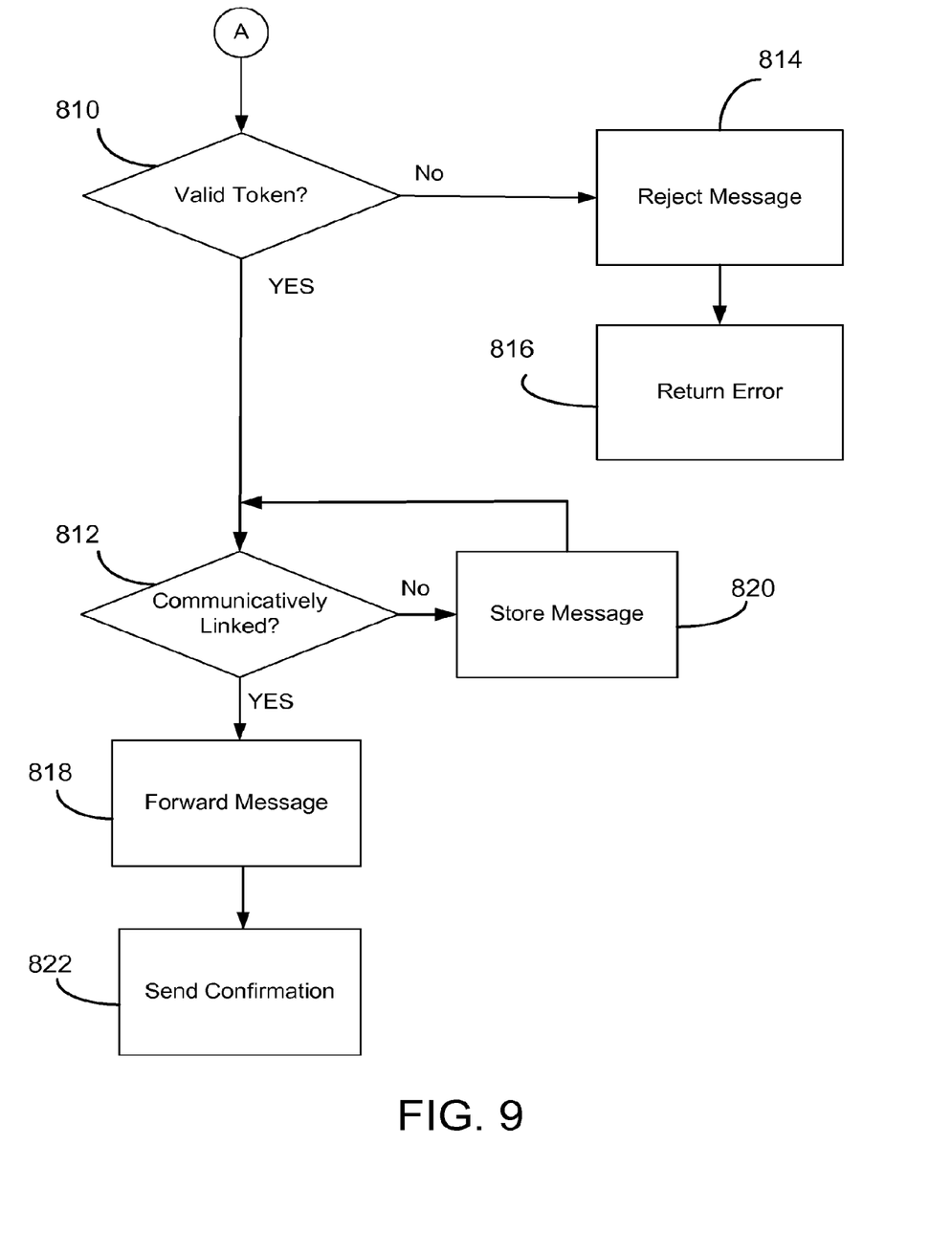

Referring now to FIGS. 8 and 9, an example method 800 for communicating a message between a client and a server through a gateway is shown according to another possible embodiment of the present disclosure. In the method 800, the client is configured to register with the gateway. The client generates a token to identify the client and the gateway and authorize the server. The client receives the message from the gateway after the server sends the message with the token to the gateway and the gateway validates the token.

Operational flow starts with an operation 802. At the operation 802, the client registers with the gateway. In particular, the client opens a communication link between the client and the gateway. The client keeps the communication link persistent and open. Finally, the client establishes a trust relationship between the client and the gateway.

Operational flow proceeds to an operation 804 where the client generates a token which identifies the client and the gateway. The token may also identify the server and include a range of other restrictions such as start/expiration date and maximum number of messages that can be authorized by this token.

Operation flow proceeds to an operation 806. At the operation 806, once the token is generated, the client issues the token to the server. The token indicates that the server is authorized to push messages to the client through the gateway. Since the token is originally generated by the client and is dedicated to a specific gateway and server, the client can always contact the gateway and revoke the token even without a notice to the server. This revocation is particularly useful where there is a need to respond to excessive activities, a change in a client state (e.g., roaming), or a DDoS attack.

Operational flow proceeds to an operation 808. At the operation 808, when the server wants to deliver a message to the client, the server sends the message with the token to the gateway first. The gateway will process the message as discussed below.

Operational flow proceeds to an operation 810. At the operation, when the gateway receives the message with the token, the operation 810 validates the token and determines whether the token is a valid token. In particular, the operation 810 validates whether the token is authorized to send the message to the client through the gateway. The operation 810 also validates whether the restrictive conditions of the token have been met. These restrictive conditions include dates and usage counts which have been specified in the token. If the token is restricted to a specific server, the operation 810 will also challenge the server to prove its identity. If the operation 810 determines that the token is a valid token, then operational flow branches "Yes" to an operation 812. If at operation 810 it is determined that the token is not a valid token, then operational flow branches to an operation 814.

At the operation 814, the gateway refuses to deliver the message to the client. The gateway also optionally returns an error notice to the server at the operation 816.

The operation 812 determines whether the client is communicatively linked to the gateway. In particular, the gateway tracks the client status to see whether the client is connected. If the operation 812 determines that the client is communicatively linked to the gateway, then operational flow branches "Yes" to an operation 818 where the gateway delivers the message to the client. If the operation 812 determines that the client is not communicatively linked to the gateway, then operational flow branches "No" to an operation 820 where the gateway stores the message in storage until the client is communicatively linked to the gateway. At an operation 822, the gateway may optionally send a confirmation notice to the server that the message has been delivered to the client.

An ad doc security mechanism can be used in the method 800. The ad doc mechanism can work securely over non-secure networks that lack any security infrastructure, such as the Internet. The ad hoc token security can work in the following way. The server first gives the client a public key when the server sends a token request to the client. The client then generates a token that includes the public key inside it as a restriction and encrypts it with the gateway. After the client delivers the token to the server, the server sends a message with the token to the gateway. The gateway decrypts the token and extracts the public key. The gateway then sends the server a random nonce encrypted in the public key. The server sends the random back to the gateway. If the server successfully decrypts nonce, the gateway will accept the message and deliver it to the client.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of authentication between a client and a server to facilitate communication of a message between the client and the server through a gateway, the method comprising:
   requesting, by the server, a token from the client;
   receiving, by the server, the token from the client, the token identifying the client and the gateway and authorizing the server to push messages to the client through the gateway as long as the token has not revoked, wherein the token may be revoked by the client with or without notice to the server; and
   sending, by the server, the message along with the token to the gateway, the gateway forwarding the message to the client after the token is validated by the gateway.

2. The method of claim 1, wherein the client issues the token to the server.

3. The method of claim 2, the method further comprising:
   using an ad hoc security mechanism to communicate between the client and the server, the ad hoc security mechanism working securely over non-secure networks.

4. The method of claim 1, the method further comprising:
using an ad hoc security mechanism to communicate between the client and the server, the ad hoc security mechanism working securely over non-secure networks.

5. The method of claim 4, wherein using the ad hoc security mechanism includes providing a public key to the client.

6. The method of claim 5, wherein using the ad hoc security mechanism includes decrypting random information encrypted by the gateway using the public key.

7. The method of claim 1, wherein the token specifies usage restrictions authorized by the token, the usage restrictions including a range of start and expiration dates and a maximum number of messages to be sent.

8. A system for authenticating and authorizing a client and a server through a gateway to facilitate message communication, the system comprising:
a processing unit; and
a memory encoding instructions that, when executed by the processing unit, cause the processing unit to:
request, by the server, a token from the client;
receive, by the server, the token from the client, the token identifying the client and the gateway and authorizing the server to push messages to the client through the gateway as long as the token has not revoked, wherein the token may be revoked by the client with or without notice to the server; and
send, by the server, a message along with the token to the gateway, the gateway forwarding the message to the client after the token is validated by the gateway.

9. The system of claim 8, wherein the processing unit issues the token to the server.

10. The system of claim 9, wherein the processing unit uses an ad hoc security mechanism to communicate between the client and the server, the ad hoc security mechanism working securely over non-secure networks.

11. The system of claim 8, wherein the processing unit uses an ad hoc security mechanism to communicate between the client and the server, the ad hoc security mechanism working securely over non-secure networks.

12. The system of claim 11, wherein using the ad hoc security mechanism includes providing a public key to the client.

13. The system of claim 12, wherein using the ad hoc security mechanism includes decrypting random information encrypted by the gateway using the public key.

14. The system of claim 8, wherein the token specifies usage restrictions authorized by the token, the usage restrictions including a range of start and expiration dates and a maximum number of messages to be sent.

15. A computer readable storage device including instructions that, when executed by a processing unit, cause the processing unit to perform steps comprising:
requesting, by the server, a token from a client;
receiving, by the server, the token from the client, the token identifying the client and a gateway and authorizing a server to push messages to the client through the gateway as long as the token has not revoked, wherein the token may be revoked by the client with or without notice to the server; and
sending, by the server, a message along with the token to the gateway, the gateway forwarding the message to the client after the token is validated by the gateway.

16. The computer readable storage device of claim 15, wherein the client issues the token to the server.

17. The computer readable storage device of claim 15, the method further comprising:
using an ad hoc security mechanism to communicate between the client and the server, the ad hoc security mechanism working securely over non-secure networks.

18. The computer readable storage device of claim 17, wherein using the ad hoc security mechanism includes providing a public key to the client.

19. The computer readable storage device of claim 18, wherein using the ad hoc security mechanism includes decrypting random information encrypted by the gateway using the public key.

20. The computer readable storage device of claim 15, wherein the token specifies usage restrictions authorized by the token, the usage restrictions including a range of start and expiration dates and a maximum number of messages to be sent.

* * * * *